United States Patent Office 3,518,096
Patented June 30, 1970

3,518,096
FOOD PRESERVING PROCESS
Grover C. Layton, deceased, late of Bunnell, Fla., by Stella Layton, administratrix, Bunnell, Fla., assignor to First National Bank of Dunedin, Fla., trustee
No Drawing. Filed Oct. 6, 1965, Ser. No. 493,578
Int. Cl. A23b 7/00
U.S. Cl. 99—154                5 Claims

ABSTRACT OF THE DISCLOSURE

Preserving fresh fruits, vegetables and cut flowers by applying a solution of eugenol or oil of cloves.

---

The present invention relates to a process and composition for the preservation of foods and flowers, particularly freshly picked desiccative fruits, vegetables and cut flowers.

The principal object of the invention is the provision of a new and improved process and composition for preserving fresh fruits, vegetables and flowers comprising preparing a solution containing essence of cloves or eugenol, covering the exterior of the food with the solution and permitting the moisture of the solution to evaporate. In some instances it is desirable to include ascorbic acid in the solution. By treating fresh fruits, vegetables and flowers by the process of the invention, the retention of weight, texture and resistance to rot, mold and discoloration can be appreciably increased so that the food and plants retain their fresh characteristics for extended periods without refrigeration or special handling. This of course, is valuable in the shipment and distribution of fresh fruits, vegetables and flowers by greatly reducing losses by spoilage and the invention is particularly useful with respect to desiccative fruits such as strawberries, blackberries, raspberries, blueberries, grapes and the like.

In carrying out the invention preferably one and one-half ounces of clove claws are boiled one hour in one gallon of water. It appears that a limited amount of the oil of cloves from the claws will be dissolved in the water and therefore the solution will be saturated with clove oil after the boiling process described.

After the clove claws have been boiled in the water, two ounces of ascorbic acid is preferably dissolved in the solution.

Alternatively, in place of boiling the clove claws in the water, eugenol, which has the formula

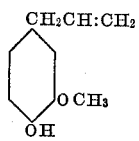

may be added to water in the proportions of about 20 to 25 drops per gallon of water, and as mentioned with respect to the preparation of the solution by the use of cloves claws, two ounces of ascorbic acid is preferably added to each gallon of the water.

As soon as practical following picking of the fruit, vegetables or flowers to be preserved, the surfaces thereof are wetted with the prepared solution. This wetting may be accomplished in any convenient manner, as by immersion, spray, fogging or the like. The food or plant articles so treated may then be packaged or not, as is desired. The residue retained on the treated articles materially inhibits rot, mold, drying and loss of weight of the articles so that rapid handling and culling of the articles by merchandizer selling these products is obviated and the articles retain a fresh condition and appearance for many days without special handling. The residue may be easily removed from the articles by rinsing in water, and the taste or flavor of the food articles is not affected.

Having thus described the invention, I claim:

1. The method of preserving fresh fruits, vegetables and cut flowers and the like comprising, preparing a solution of water saturated with oil of cloves, and wetting the surfaces of the food articles to be preserved with said solution.

2. The method defined in claim 1 in which a saturated solution is prepared by boiling clove claws one hour in the water, the proportions being one and one half ounces of clove claws to each gallon of water.

3. The method of preserving fresh fruits, vegetables and cut flowers and the like comprising, wetting the surfaces of the articles to be preserved with a solution comprising water saturated with oil of cloves.

4. The method defined in claim 3 in which a saturated solution is prepared by boiling clove claws one hour in the water, the proportions being one and one-half ounces of clove claws to each gallon of water.

5. The method of preserving fresh fruits, vegetables and cut flowers consisting essentially of preparing a solution of water and eugenol, the amount of eugenol dissolved in the water being that dissolved by mixing 20 to 25 drops of eugenol with a gallon of water, and wetting the exterior of the articles to be preserved with said solution.

References Cited

UNITED STATES PATENTS 2,955,041  10/1960  Broderick _____ 99—140

OTHER REFERENCES

McCulloch, Disinfection and Sterilization, Lea & Fekiger 1945, pp. 367–368.

Jacobs, Synthetic Food Adjuncts—Chemical Preservatives and Stabilizers, D. Van Nostrand Co., Inc., N.Y. 1947, p. 249

Hackh's Chemical Dictionary, Ed Grant, 3rd Ed. McGraw-Hill Book Co., N.Y., 1944, pp. 325–326.

Merck Index 7th ed., Merck & Co., Rahway, N.J., 1960, pp. 439–440.

A. LOUIS MONACELL, Primary Examiner

J. M. HUNTER, Assistant Examiner

U.S. Cl. X.R.

71—68